No. 624,038. Patented May 2, 1899.
W. HULSLANDER.
VEHICLE WHEEL.
(Application filed Apr. 27, 1896.)
(No Model.)
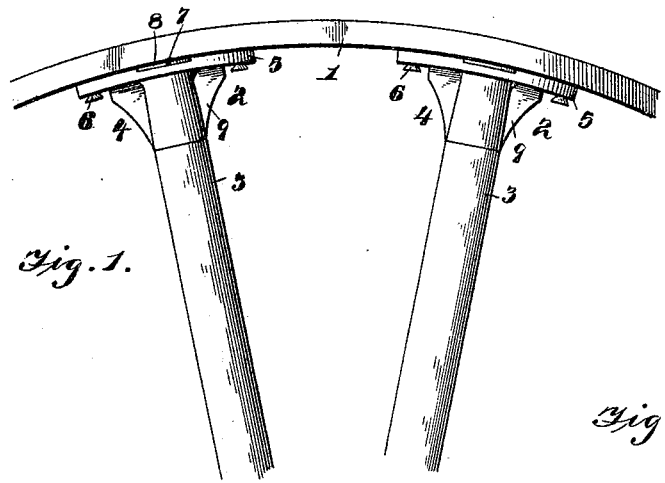
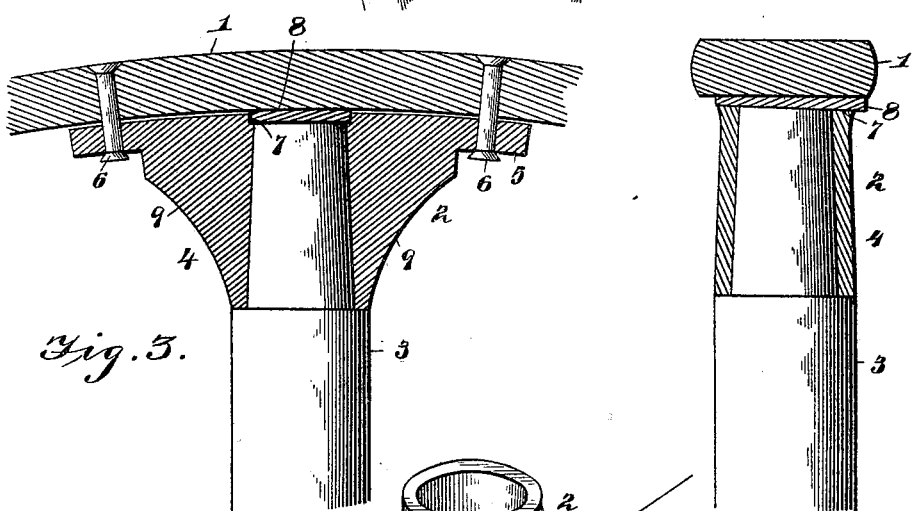
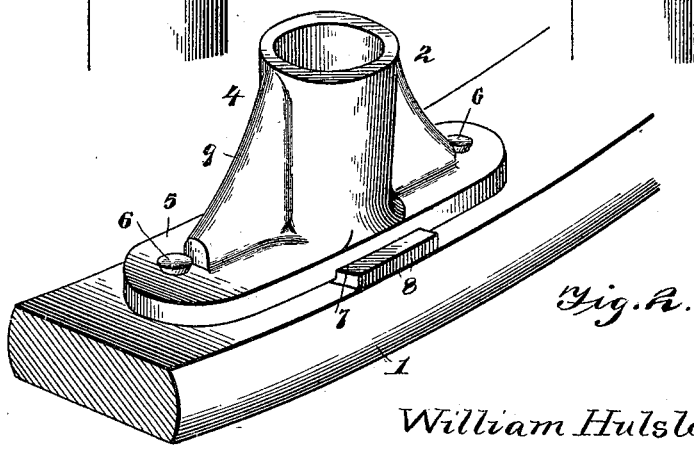
Inventor
William Hulslander.
Witnesses
By his Attorneys,

UNITED STATES PATENT OFFICE.

WILLIAM HULSLANDER, OF DAVENPORT, IOWA.

VEHICLE-WHEEL.

SPECIFICATION forming part of Letters Patent No. 624,038, dated May 2, 1899.

Application filed April 27, 1896. Serial No. 589,304. (No model.)

*To all whom it may concern:*

Be it known that I, WILLIAM HULSLANDER, a citizen of the United States, residing at Davenport, in the county of Scott and State of Iowa, have invented a new and useful Vehicle-Wheel, of which the following is a specification.

The invention relates to improvements in wheels.

The object of the present invention is to improve the construction of wheels and to provide one which will be strong and durable and which may be readily tightened should it become loose at the rim.

The invention consists in the construction and novel combination and arrangement of parts hereinafter fully described, illustrated in the accompanying drawings, and pointed out in the claim.

In the drawings, Figure 1 is a side elevation of a portion of the wheel constructed in accordance with this invention. Fig. 2 is a detail perspective view illustrating the manner of connecting the outer ends of the spokes to the rim of the wheel. Fig. 3 is a detail sectional view of the same, taken longitudinally of the rim. Fig. 4 is a similar view taken transversely of the rim.

Like numerals of reference designate corresponding parts in all the figures of the drawings.

1 designates a rim constructed of metal and constituting the felly and tire and having secured to its inner face spoke-sockets 2, receiving the outer ends of the spokes 3. Each spoke-socket has a tubular portion 4 (preferably tapering outward) to receive the tenon of the spoke, and it is provided adjacent the rim with a flat and slightly-curved attaching-plate 5, secured by fastening devices 6 to the flat inner face of the rim. The fastening devices herein shown are rivets, which have their outer terminals countersunk into the rim or felly in order that the latter may present a smooth outer periphery to receive the tire, their bodies passing through cylindric holes in the rim and attaching-plate and their inner terminals formed with conical heads, standing initially beyond the inner face of the plate, and whose smaller ends are of the same diameter as said holes. The spoke-socket is provided at its longitudinal center, in the outer face of the plate 5 and across the outer end of the tubular portion, with a recess or groove 7, forming a transverse opening adapted to receive a wedge 8, which when the parts become loose can be driven into the transverse opening to tighten them. The wedge is interposed between the inner face of the rim and the outer end of the spoke and may be readily driven in sufficiently to take up any looseness of parts. The tubular portion of the socket is connected with the attaching-plate at opposite sides by triangular webs or flanges 9, which strengthen the construction, all parts of the socket being preferably integral and of metal. This improved spoke-socket is employed when the wheel is first built, at which time the spoke will be tight and its outer end will extend entirely across the recess 7 and bear firmly against the inner face of the rim. In time atmospheric changes and continued wear will loosen the spoke slightly, and a thin wedge is then inserted in the recess between the end of the spoke and the rim. Later this wedge is replaced by a thicker one, and so on until a wedge 8 of the maximum thickness permitted by the depth of the recess is necessarily used, as seen in Fig. 4. If the parts had been properly proportioned and constructed, the wheel will by this time be old and worn, and resource is had to a steel or very hard wedge of even greater thickness than that illustrated. The forcible insertion of this wedge will obviously strain the entire spoke-socket slightly away from the rim, but this action is permitted by the conical heads at the inner ends of the fastening-rivets 6, which heads compress and draw slightly into the holes in the plate 5. The result, however, is the tightening of the spoke. Each wedge can be easily removed by placing a suitable tool against its smaller end and driving it out of place, which would not be the case if the recess 7 extended only into and not entirely across the spoke-socket.

It will be seen that the means for connecting the outer ends of the spokes with the rim or felly is simple and efficient, and yet possesses characteristics which permit a loose spoke to be tightened to a considerable degree within its socket and afterward to permit the entire socket to be tightened with respect to the rim.

Changes in the form, proportion, and minor details of construction may be resorted to without departing from the spirit or sacrificing any of the advantages of the invention, such as applying the spoke-socket and the wedge to wheels having their rims composed of a felly and a tire.

What I claim is—

In a wheel, the combination with the rim having a flat inner face, and the spokes whose outer ends bear initially against said face; of a spoke-socket comprising a metallic attaching-plate extending longitudinally of and standing initially against the inner face of the rim, said plate having cylindric holes through its body near its ends, and a tubular spoke-receiving portion projecting inward from the center of the plate, the latter having a transverse recess or groove extending entirely across its outer face and open at both sides and also extending across the end of the spoke-opening, a wedge adapted to be driven along said recess between the outer end of the spoke and the inner face of the rim, and rivets extending through the rim and said holes in the attaching-plate with their outer terminals countersunk into the rim and their inner terminals having conical heads standing initially beyond the inner face of the plate and whose smaller ends are of the same diameter as and adjacent to said holes, all as and for the purpose set forth.

In testimony that I claim the foregoing as my own I have hereto affixed my signature in the presence of two witnesses.

WILLIAM HULSLANDER.

Witnesses:
JOHN MOLANDER,
WILLIE HAMARLY.